Patented Apr. 10, 1951

2,548,765

UNITED STATES PATENT OFFICE 2,548,765

METHOD OF PRODUCING ELECTROFORMS

William Henry Banks, Hampton, Patrick Bernard Upton, Bromley, and John Richard Scott, Croydon, England, assignors to The Printing and Allied Trades Research Association, London, England, and The Research Association of British Rubber Manufacturers, Croydon, England, both companies of Great Britain No Drawing. Application September 11, 1947, Serial No. 773,498. In Great Britain December 10, 1946

1 Claim. (Cl. 204—6)

This invention relates to electro-forms such as electro-type printing plates and methods of producing them.

The object of the present invention is to provide a matrix onto which the electro-form is deposited from a substance which has a longer useful life and which can more readily be prepared to receive a different impression than the substances heretofore commonly in use.

The invention is particularly applicable for making electro-forms in the manner described in the specification of United States patent application Serial No. 686,948.

A common method of preparing replicas by an electro-forming process is to prepare a matrix in wax from the original. We are aware that certain materials selected from the group of materials known as thermoplastics (e. g., vinyl chloride, vinyl acetate co-polymers) can be used in place of wax with considerable advantage. Among these advantages is the fact that an electro-form having been made by electro-deposition and subsequently stripped from the plastic matrix, the matrix can be re-used many times or alternatively, by warming and brushing or rolling, it can be made ready to receive a different impression. The thermoplastics at present used for this process have however a limited life because they tend with continued use to become harder.

According to the present invention we form a matrix from vulcanised rubber or synthetic rubber compositions of the type commonly known as ebonite or vulcanite, which have a softening or yield temperature below 100° C. so that they can be moulded under pressure at a temperature below 100° C. but above the yield temperature and by virtue of their latent elastic recovery can after use in electroforming be rendered ready by treatment (for example, with hot water) to receive another impression.

As an example of the procedure—a sheet ⅛" thick of ebonite composed of natural rubber 78 parts, and sulphur 22 parts, and having a yield temperature between 40° C. and 45° C., obtained for example by vulcanising for 5 hours at 155° C., is pressed against an engraved block at 70° C., that is, well above the yield temperature, under a pressure of ½ ton/sq. inch. When cooled at 25° C.–30° C., that is, below the yield temperature, the pressure is released and a film of metallic silver is deposited on the matrix so obtained from the sheet so as to form a basis for the electrodeposition of an electro-form, using the methods described in said United States application Serial No. 686,948.

After the electro-form has been made, the matrix and its adhering electro-form is immersed for 30 seconds in water at 90° C. This treatment effects a ready separation between the electro-form and matrix and leaves the latter in a smooth condition (i. e., the matrix loses its relief imprint) ready to receive a further impression on which a further electro-form can be made without further treatment, such as brushing or rolling, due to the phenomenon known as the "memory effect" or latent elastic recovery, which property is developed to a high degree in ebonite.

As a further example of a preferred procedure, a sheet of ebonite composed of natural rubber 73–83 parts and sulphur 19–25 parts and having a yield temperature between 40° C. and 45° C. is moulded under pressure against a mould at 70° C.–75° C. The sheet is cooled to 25° C.–30° C., and the pressure is released. A metallic film is deposited chemically on the matrix, metal being electro-deposited thereon to form an electro-form. The electro-form is then separated from the matrix by heat treatment to restore the original condition of the matrix by reason of the latent elastic recovery of the matrix. The matrix is then remoulded, and a metallic film is deposited thereon chemically, metal being electro-deposited to form a further electro-form which is then separated from the matrix.

Alternatively, if a number of electro-forms are required from the same pattern or impression on the matrix, stripping is effected in the usual way without hot water treatment.

Another advantage of employing ebonites is that the contraction of the matrix is less than that of other materials hitherto commonly in use.

What we claim is:

The manufacture of electro-forms by deposition which consists in moulding under pressure a sheet of ebonite composed of natural rubber 73–83 parts and sulphur 19–25 parts and having a yield temperature between 40° C. and 45° C. against a mould at 70°–75° C., cooling the sheet to 25° C. to 30° C., releasing the pressure, chemically depositing a metallic film on the matrix, electrodepositing metal thereon to form an electro-form, separating the electro-form from the matrix by heat treatment to restore the original condition of the matrix by reason of the latent elastic recovery of the matrix, remoulding the matrix, chemically depositing a metallic film thereon, electrodepositing metal to form a further electroform and separating the electroform from the matrix.

WILLIAM HENRY BANKS.
PATRICK BERNARD UPTON.
JOHN RICHARD SCOTT.

REFERENCES CITED

The following references are of record in the file of this patent:

UNITED STATES PATENTS

| Number | Name | Date |
|---|---|---|
| 1,588,278 | Stenz | June 8, 1926 |
| 2,041,743 | Browne | May 26, 1936 |
| 2,368,085 | Barbieri | Jan. 30, 1945 |
| 2,400,518 | Kreber et al. | May 21, 1946 |

OTHER REFERENCES

Gottlob's Technology of Rubber, translated from the 1925 German edition and revised by Joseph L. Rosenbaum (1927), pages 302, 303, 313.

Rubber, Physical and Chemical Properties, by T. R. Dawson and B. D. Porritt, published by the Research Association of British Rubber Manufacturers, 1935, pages 505, 506.